(12) United States Patent  
Oksanen

(10) Patent No.: US 6,603,734 B1
(45) Date of Patent: Aug. 5, 2003

(54) METHOD FOR ELIMINATING INTERFERENCE IN AN OFDM RADIO RECEIVER

(75) Inventor: Lauri Oksanen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/242,530

(22) PCT Filed: Jun. 22, 1998

(86) PCT No.: PCT/FI98/00544

§ 371 (c)(1),
(2), (4) Date: Feb. 18, 1999

(87) PCT Pub. No.: WO99/03227

PCT Pub. Date: Jan. 21, 1999

(30) Foreign Application Priority Data

Jun. 26, 1997 (FI) .................................................. 972758

(51) Int. Cl.⁷ .............................................. H04L 27/28
(52) U.S. Cl. ...................................... 370/203; 375/260
(58) Field of Search ................................ 370/203–208, 370/328, 329, 330, 335, 383, 400, 344, 269, 268; 375/260, 270, 301, 321, 227, 229, 144, 148, 267

(56) References Cited

U.S. PATENT DOCUMENTS

| | | | |
|---|---|---|---|
| 3,488,445 A | | 1/1970 | Chang |
| 4,782,489 A | * | 11/1988 | Moulsley ................... 714/746 |
| 5,416,801 A | * | 5/1995 | Chouly et al. .............. 375/260 |
| 5,502,713 A | * | 3/1996 | Lagerqvist et al. ......... 370/252 |
| 5,694,389 A | | 12/1997 | Seki et al. |
| 5,790,516 A | * | 8/1998 | Gudmunson et al. ....... 370/210 |
| 6,005,894 A | * | 12/1999 | Kumar ....................... 375/270 |
| 6,317,456 B1 | * | 11/2001 | Sayeed ....................... 375/227 |

FOREIGN PATENT DOCUMENTS

| | | |
|---|---|---|
| EP | 734 132 A2 | 9/1996 |
| EP | 0734132 A2 | 9/1996 |
| EP | 753 948 A1 | 1/1997 |
| EP | 788 265 A2 | 8/1997 |
| EP | 823 804 A2 | 2/1998 |
| EP | 869 645 A2 | 10/1998 |
| EP | 0869645 A2 | 10/1998 |
| WO | WO 96/41458 | 12/1996 |
| WO | WO 97/04572 | 2/1997 |
| WO | WO 98/10542 | 3/1998 |

* cited by examiner

Primary Examiner—Duc Nguyen
(74) Attorney, Agent, or Firm—Pillsbury Winthrop LLP

(57) ABSTRACT

The invention relates to a method for eliminating interference in an OFDM (Orthogonal Frequency Division Multiplexing) radio receiver In the method, coded signals that are transmitted on subcarriers are received, reliability information generated for the signals being used in their soft decoding In accordance with the invention, the signal-to-interference ration of the subcarrier is used as the reliability information, the signal-to-interference ratio being defined by dividing the amplitude of the received signal by the interference amplitude. The interference amplitude is generated by calculating the deviation of the amplitudes of a set of selected signals from the average amplitude level of the set of signals. The average amplitude level of the set of signals is the mean value, median or some other statistical quantity indicative of the average level of the amplitudes of the set of signals. The deviation from the average amplitude level of the set of signals is the standard deviation, variance or some other statistical deviation-indicating quality of the set of signals. The amplitudes of the set of signals are selected from successive symbols in the time domain and/or from adjacent subcarriers in the frequency domain. The invention also relates to an OFDM radio receiver using the method.

20 Claims, 2 Drawing Sheets

METHOD FOR ELIMINATING INTERFERENCE IN AN OFDM RADIO RECEIVER

This application is the national phase of international application PCT/FI98/00544 filed Jun. 22, 1998 which designated the U.S.

FIELD OF THE INVENTION

The invention relates to a method for eliminating interference in an OFDM (Orthogonal Frequency Division Multiplexing) radio receiver which receives coded signals transmitted on subcarriers, reliability information generated for the signal being used in soft decoding of the coded signals.

BACKGROUND OF THE INVENTION

In the MCM methods (Multi-Carrier Modulation), information to be transferred is divided into parallel bit streams, each of which having a number of bits that is only a fraction of the amount of information to be transferred. Parallel bit streams are used for modulating several different carriers.

One form of the MCM methods is the OFDM method (Orthogonal Frequency Division Multiplexing) described in U.S. Pat. No. 3,488,445. In OFDM, the parallel bit streams are modulated by using densely disposed subcarriers whose radio spectra partly overlap because steep band-pass filters separating subcarrier spectra are not used in the method. In the time domain, forms that are mutually orthogonal are chosen for the subcarriers, i.e. forms that can be separated from one another although the radio spectra of the subcarriers may overlap. The waveforms can be generated at a transmitter and they can be decomposed at a receiver by using mathematical fast Fourier transform (FFT) or the inverse form thereof.

In OFDM, wide bandwidths, for example 1.5 MHz, are typically used, and data transmission rates are also high, for example 1.7 Mbit/s. The number of subcarriers is large, typically more than a hundred, for example 180 subcarriers, per channel.

OFDM is used as a modulation method for new digital broadcasting DAB (Digital Audio Broadcasting). Research is being conducted to use the method in DVB (Digital TV Broadcasting). In fixed data transmission networks, the method is used for implementing high-capacity modems, in association with modems known as ADSL modems (Asymmetric Digital Subscriber Loop). Transmission rates as high as 2–6 Mbit/s are then achieved by using a conventional twisted-pair cable of a telephone subscription.

The OFDM method is also well suitable for use in mobile telephone systems. By using the method, services requiring a wide transmission band, such as packet data transmission or video image transmission, can be efficiently implemented.

Communication on a radio path may include narrow-band interference interfering with some subcarriers. Interference may originate from an adjacent channel, for example. When the OFDM method is used, interleaving and coding of information to be transmitted is therefore needed so as to obtain an acceptable bit error ratio level for the information to be transferred.

One of the most efficient coding methods is convolutional coding. In that case, soft decoding is used at the receiver. Soft means here that the value 0 or 1 is not directly set for a bit, but reliability information obtained from the received signal is utilized for estimating, for example, with a certain probability, whether the bit decision made was correct.

At a simple differential demodulation receiver not employing amplitude equalization, the reliability information is derived from the amplitudes of the demodulated bits, the amplitudes representing carrier, interference and noise.

However, the described manner of obtaining reliability information is not satisfactory, since high interference may entirely mask the desired signal, and the amplitude measured at the receiver may then be very high, whereby, correspondingly, a very high value is obtained as the reliability value even though the desired signal is entirely buried in the interfering signal. Decoding convolutional coding of said received signal then leads to errors.

BRIEF DESCRIPTION OF THE INVENTION

An object of the invention is thus to provide a method and equipment implementing the method so as to solve the above mentioned problems. This is achieved by the method of the type presented in the introduction, which is characterized in that the signal-to-interference ratio of the subcarrier is used as the reliability information, the signal-to-interference ratio being defined by dividing the amplitude of the received signal by the interference amplitude which is defined by calculating the deviation of the amplitudes of a set of selected signals from the average amplitude level of the set of signals.

The invention also relates to an OFDM (Orthogonal Frequency Division Multiplexing) radio receiver comprising an antenna; radio frequency parts for receiving coded signals transmitted on subcarriers via the antenna; a demultiplexer for dividing the received signal into orthogonal subcarriers; a demodulator for demodulating each subcarrier signal into symbols; a reliability part for generating reliability information for the received signals; means for de-interleaving the symbols between different subcarriers; a decoding part for soft decoding the coding of the symbols by using the reliability information. The OFDM radio receiver of the invention is characterized in that the reliability part is arranged to generate the reliability information as the signal-to-interference ratio; to define the signal-to-interference ratio by dividing the amplitude of the received signal by the interference amplitude; to define the interference amplitude by calculating the deviation of the amplitudes of a set of selected signals from the average amplitude level of the set of signals.

The preferred embodiments of the invention are disclosed in the dependent claims.

The invention is based on the idea that when a modulation method not affecting the signal amplitude is used for generating symbols to be transmitted, it can then be assumed that the signal amplitude is constant. The amplitude remains almost constant between symbols sequential in the time domain, since the symbols are short. Propagation delay is small at least in a microcell, and consequently a channel response does not change rapidly in the frequency domain either, whereby the amplitudes are also assumed to remain almost constant between symbols in parallel subcarriers in the frequency domain. Amplitude variations thus indicate the effect of interference on the signal.

The method and system of the invention provide many advantages. Reliability of soft decoding is considerably improved. When interference occurs on a channel, the bit error ratio of the information transferred on the channel can be considerably improved by using the method of the invention. Information, such as packet data, requiring a demanding bit error ratio can then be transferred.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

The present invention is suitable for use in all OFDM radio receivers in which interference may occur within the frequency range of the received subcarriers.

Figure 1:
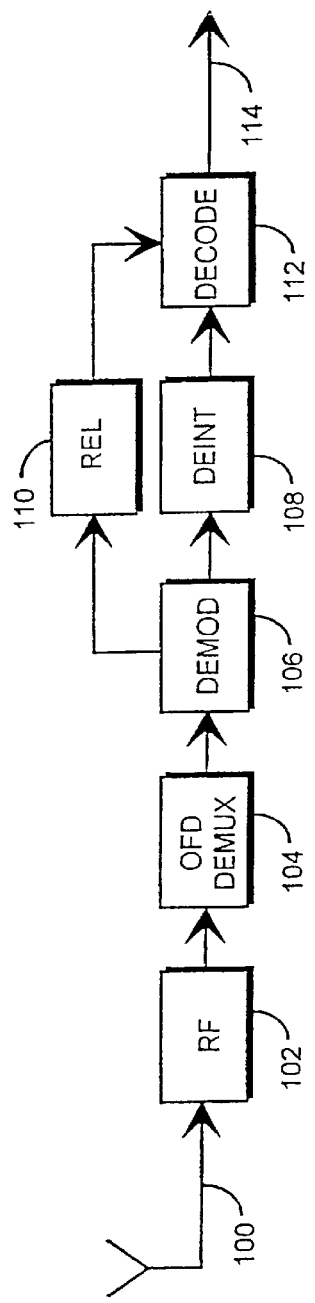
FIG. 1 shows an example of the receiver of the invention.

FIG. 1 shows a simplified block diagram of the receiver of the invention. Only blocks essential to the description of the invention are included in FIG. 1, but it is obvious to those skilled in the art that a conventional OFDM radio receiver also includes many other operations and structures which do not need to be dealt with in more detail in this context. Radio frequency parts 102 are used for receiving a frequency range including the desired subcarriers via an antenna 100. The received signal is applied to a demultiplexer 104 where the signal is divided into orthogonal subcarriers by FFT, for example. The subcarriers are applied to a demodulator 106 where the signals are demodulated into real and imaginary parts. In a reliability part 110, reliability information is generated for each subcarrier. In means 108, symbols are de-interleaved, after which the symbols are applied to a decoder 112 which decodes the error correction coding used, such as convolutional coding, by using soft decoding. In other words, the reliability information obtained from the reliability part 110 is utilized when bit decisions are made. In decoding, for example the Viterbi algorithm can be used. Decoded data 114 received is forwarded to be further presented or processed. If the transferred information is not coded, or if hard decoding is used, soft decoding and reliability information are, of course, not used.

In accordance with the invention, the reliability part 110 is arranged to generate the reliability information as the signal-to-interference ratio. The signal-to-interference ratio is defined by dividing the amplitude of the received signal by the interference amplitude. The symbols must therefore be generated by a modulation method not affecting their amplitude in transmission. Such a method is for example the QPSK method (Quadrature Phase Shift Keying) employing four different carrier phases preferably differing $\pi/2$ radians from one another. Each phase shift is referred to as a symbol. The symbol represents two bits, in other words, the real part and the imaginary part of the symbol each basically represents one bit.

In accordance with a preferred embodiment, the invention is implemented by software and thus requires only relatively simple software modifications for the signal processor of the receiver.

Figure 2A:
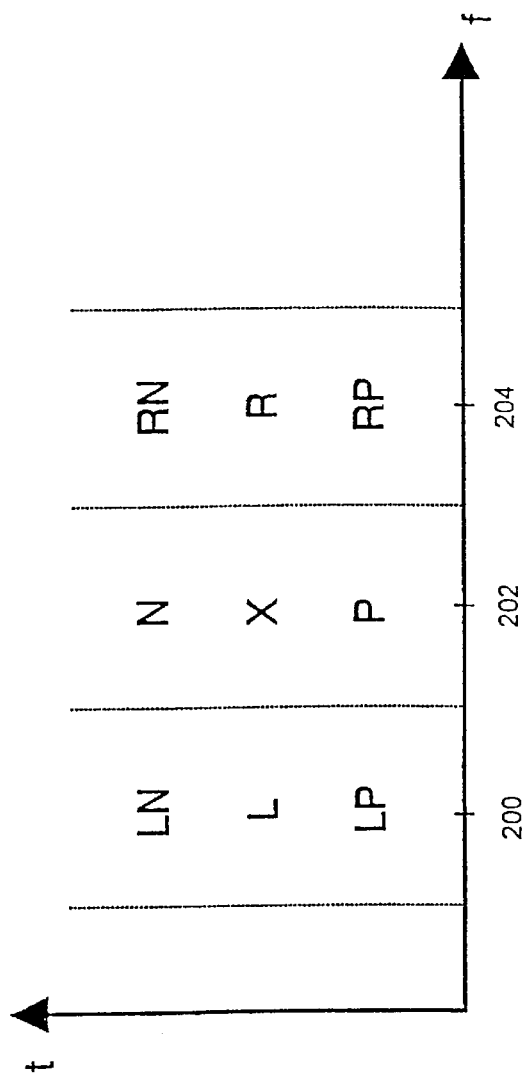
FIG. 2A shows OFDM symbols in the frequency-time-domain.

The interference amplitude is defined by calculating the deviation of the amplitudes of a set of selected signals from the average amplitude level of the set of signals. FIG. 2A shows how the interference amplitude is calculated for signal X of a subcarrier 202. Signal P preceding signal X and signal N following signal X are included in the set of signals. Calculation thus includes three signals, X, P and N. In the time domain, more or fewer signals can also be included. In addition, signals L and P received on adjacent subcarriers 200, 204 are also included in the set of signals. Signals LP, RP preceding the adjacent subcarrier 200, 204 signals in the time domain, and signals LN, RN, following them, are also included. In the frequency domain, more or fewer signals can also be included. In respect of the invention it is essential that, in addition to the desired signal, a predetermined number of signals from the successive symbols in the time domain and/or from the adjacent subcarriers 200, 202, 204 in the frequency domain are included in the set of signals.

Depending on, for example, the channel and interference, the selection rule for the set of signals can be changed. The number of signals selected to the set of signals is considerably smaller than the number of subcarriers, even smaller than one fifth of the number of subcarriers.

When the QPSK modulation method is used it can be assumed that the amplitudes of the real and the imaginary parts of the signal are the same. The average level and the deviation can then be separately calculated for the real and the imaginary parts of the signal. The mean values are calculated from the average level and from the deviation so obtained, the mean values then being set as the average levels and deviations of the real and the imaginary parts.

The set of signals can also be so assembled that weighting coefficients are set to the signal amplitudes, for example in such a way that signals that are, in the time and frequency domains, farther from signal X have a smaller weighting coefficient value than those closer to signal X. The weighting coefficients can also be adaptive, i.e. they can automatically adapt to new conditions.

The amplitude of the single signal X, the average amplitude determined on the basis of the same samples as the set of signals, the average amplitude determined on the basis of the samples selected in the time domain, or the average amplitude determined on the basis of the samples selected in the frequency domain can be used as the amplitude of the received signal.

Figure 2B:
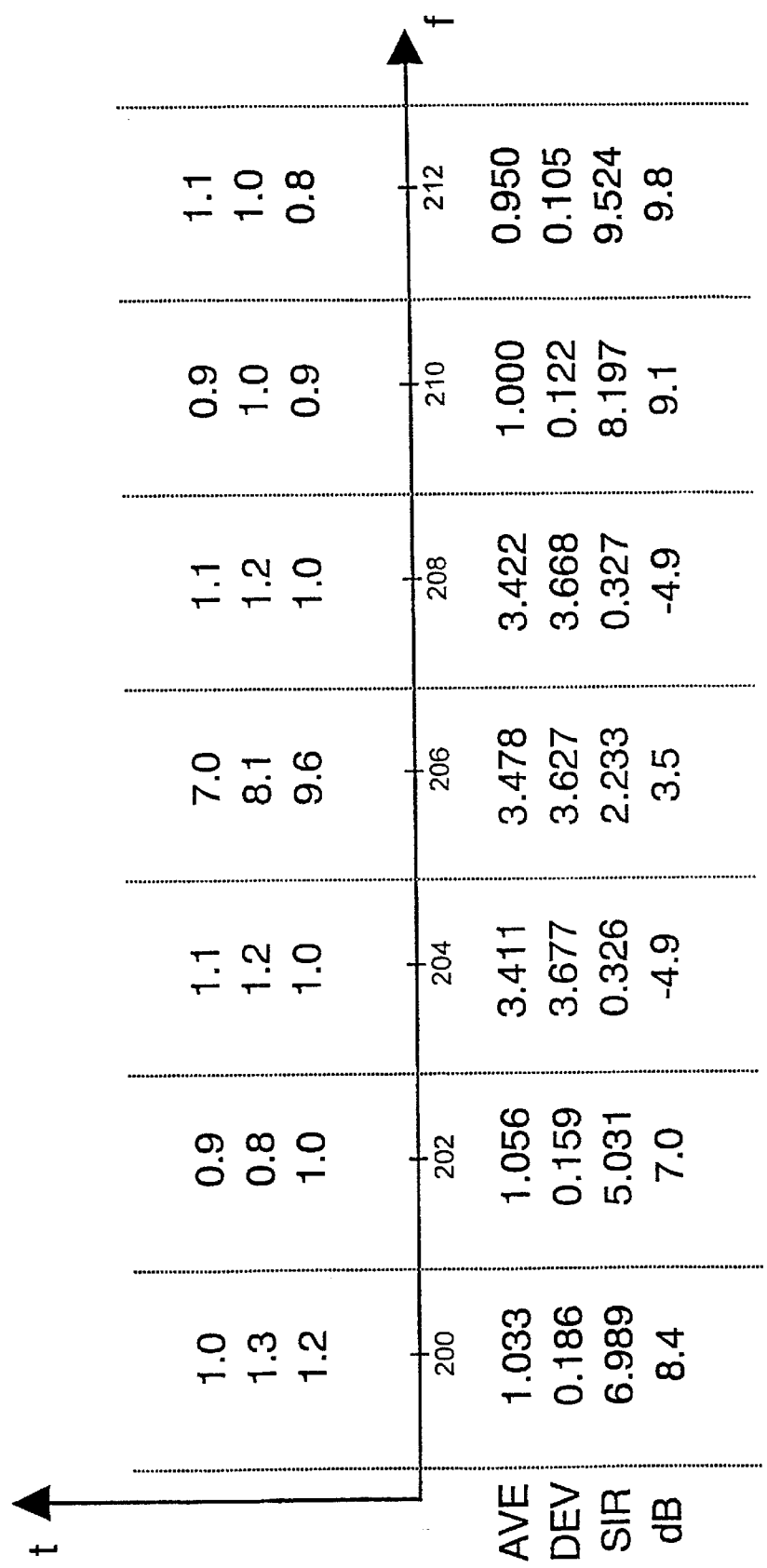
FIG. 2B shows the defining of the signal-to-interference ratio.

Consequently, nine signals were selected in the set of signals in the example. FIG. 2B now shows the processing of the signals on subcarriers 200–212. In the figure, numerical values illustrate the amplitude of the received signal. The amplitude is presented as a scaled numerical value, and, in transmission, the amplitude is always one. A variation of, for example, about 30% from this level is considered as a normal variation caused by channel conditions. FIG. 2B illustrates reception in a normal situation on the carriers 200, 202, 204, 208, 210, 212. Interference appears on the carrier 206.

In the figure, the mean value AVE is used as the average level, and the deviation from the average level is indicated by the standard deviation DEV calculated by the (n−1) formula. Calculation is carried out according to the example in FIG. 2A, i.e. the signal preceding and the signal following the signal to be calculated are included in the set of signals. In addition, three signals from the subcarrier to the left and three signals from the subcarrier to the right of said subcarrier are included in the set of signals, if possible. In addition to the amplitude 1.3 of the middle signal of the subcarrier 200, the amplitude 1.2 of the preceding signal and the amplitude 1.0 of the following signal are thus included in the set of signals. No subcarrier exists to the left of the subcarrier 200, and only the amplitudes 1.0, 0.8 and 0.9 of the subcarrier 202 to the right are therefore included in the set of signals. The mean value of the set of signals is 1.033, and the standard deviation is 0.186. The signals of the subcarriers 200, 202 and 204 are included in the following set of signals, the signals of the subcarriers 202, 204, 206 are included in the subsequent set of signals, etc. Only the signals of two subcarriers 210, 212 are, again, included in the rightmost set of signals, as no subcarrier exists to the right of the subcarrier 212.

The average level can also be expressed as some other statistical quantity, the median, for example. Similarly, the deviation can be expressed as some other statistical quantity, the variance, for example.

At the periphery of the frequency range, for example two carriers from the right or from the left side can be included in the set of signals in such cases where the leftmost or the rightmost carrier does not exist, whereby the number of signals in the set of signals is the same for all carriers. However, this is not the case in the example.

When the signal-to-interference-ratio SIR is calculated, the amplitude of a single signal is used as the amplitude of the received signal, i.e. in the example in FIG. 2B, always the middle signal of the middle subcarrier of each set of signals. For example, the signal-to-interference ratio SIR of the subcarrier 200 is thus calculated by dividing the amplitude 1.3 of the middle signal by the standard deviation 0.186, giving the result 6.989. For the sake of clarity, FIG. 2B presents the corresponding numerical value of the signal-to-interference ratio in decibels dB, whereby the SIR 6.989 corresponds to 8.4 dB, for example. This modification is not likely to be used in the calculations carried out in the method of the invention, because the numbers can be processed faster directly in SIR form. Scaling can also vary according to HW components used in the calculation and the calculation can be so optimized that laborious floating point arithmetic need not be used, for example.

In decibels, the normal SIR is about 10 dB. It can be inferred that interference does not exist on the subcarriers 200, 202, 210, 212. The effect of interference on the subcarrier 204 appears in the calculation result, but interference is high particularly on the subcarrier 206. The subcarriers 208 and 204 are at the periphery of interference. Without the procedure of the invention, it could be assumed that interference does not exist on the subcarrier 206. As appears from the figure, in soft decoding, besides taking into account the signal-to-interference ratio, it is also essential to take into account how much the amplitude of the received signal deviates from the normal level. Naturally, the amplitude varies particularly under conditions where a transmitting radio transmitter moves. However, these facts can be inferred from timing factors, etc., and cannot therefore disturb the operation of the invention.

The reliability part 110 thus forwards the signal-to-interference ratio in a suitable form to the decoding part 112 utilizing, in soft decoding, the information according to which it is highly probable that high interference exists in the signals received on the subcarrier 206. Without the invention, the reliability information would be only the amplitude of the real or the imaginary part of the demodulated PSK symbol. In accordance with the invention, reliability information is the signal-to-interference ratio calculated according to the method.

Of course, a brief example like this cannot clearly show how the processing of statistical material clearly indicates differences between reliability values. In a real situation, even hundreds of subcarriers exist, whereby interference of the type presented in FIG. 2B will be observed more clearly when compared with the amplitude levels of the previously received signals.

Although the invention is described above with reference to the example according to the accompanying drawings, it is obvious that the invention is not restricted thereto, but it can be modified in a variety of ways within the scope of the inventive idea disclosed in the attached claims.

What is claimed is:

1. A method for eliminating interference in an orthogonal frequency division multiplexing radio receiver of a wide band mobile telecommunication system, the method comprising:

receiving coded signals transmitted on subcarriers;

generating reliability information for the received coded signals;

using the reliability information in soft decoding of the coded signals;

using a signal-to-interference ratio of a subcarrier as the reliability information, the signal-to-interference ratio being defined by dividing an amplitude of a received signal by an interference amplitude of the received signal, the interference amplitude being defined by calculating a deviation of the amplitudes of a set of selected signals from an average amplitude level of the set of selected signals; and selecting the amplitudes of the set of selected signals from successive symbols in the time domain and from adjacent subcarriers in the frequency domain such that the number of signals selected as part of the set of selected signals is smaller than one fifth of the number of subcarriers.

2. The method of claim 1, wherein the average amplitude level of the set of signals is a mean value, median or some other statistical quantity indicative of the average level of the amplitudes of the set of selected signals.

3. The method of claim 1, wherein the deviation from the average amplitude level of the set of selected signals is a standard deviation, variance or some other statistical deviation-indicating quantity of the set of selected signals.

4. The method of claim 1, wherein in the modulation method used, the amplitude is not affected by modulation.

5. The method of claim 4, wherein the modulation method used is quadrature phase shift keying.

6. The method of claim 1, wherein the average level and the deviation are calculated separately for the real and imaginary parts of the signal.

7. The method of claim 1, wherein an amplitude of a single signal is used as the amplitude of the received signal.

8. The method of claim 1, wherein an average amplitude determined based on the same signals as the set of selected signals is used as the amplitude of the received signal.

9. The method of claim 1, wherein an average amplitude determined based on the signals selected in the time domain is used as the amplitude of the received signal.

10. The method of claim 1, wherein an average amplitude determined based on the signals selected in the frequency domain is used as the amplitude of the received signal.

11. An orthogonal frequency division multiplexing radio receiver comprising:

an antenna;

radio frequency parts configured to receive coded signals transmitted on subcarriers via the antenna;

a demultiplexer configured to divide received signals into orthogonal subcarriers;

a demodulator configured to demodulate each subcarrier signal into symbols;

a reliability part configured to generate reliability information as a signal-to-interface ratio of a subcarrier for a received signal, to define the signal-to-interference ratio by dividing an amplitude of a received signal by an interference amplitude, to define the interference amplitude by calculating a deviation of amplitudes of a set of selected signals from an average amplitude level of the set of signals, and to select the amplitudes of the set of selected signals from successive symbols in the time domain and from adjacent subcarriers in the frequency domain such that the number of signals selected as part of the set of selected signals is smaller than one fifth of the number of subcarriers;

means for de-interleaving of the symbols between different subcarriers;

a decoding part for soft decoding the coding of the symbols by using the reliability information.

12. The radio receiver of claim 11, wherein the reliability part is arranged to define the average amplitude level of the set of selected signals by calculating a mean value or some other statistical quantity indicative of the average level of the amplitudes of the set of selected signals.

13. The radio receiver of claim 11, wherein the reliability part is arranged to define the deviation from the average amplitude level of the set of selected signals by calculating a standard deviation, variance or some other statistical deviation-indicating quality of the set of selected signals.

14. The radio receiver of claim 11, wherein in the modulation method used, the amplitude is not affected by modulation.

15. The radio receiver of claim 14, wherein the modulation method used is quadrature phase shift keying.

16. The radio receiver of claim 11, wherein the reliability part is arranged to calculate the average level and deviation separately for the real and imaginary parts of the signal.

17. The radio receiver of claim 11, wherein the reliability part is arranged to use an amplitude of a single signal as the amplitude of the received signal.

18. The radio receiver of claim 11, wherein the reliability part is arranged to use, as the amplitude of the received signal, an average amplitude determined based on the same signals as the set of selected signals.

19. The radio receiver of claim 11, wherein the reliability part is arranged to use an average amplitude determined based on the signals selected in the time domain as the amplitude of the received signal.

20. The radio receiver of claim 11, wherein the reliability part is arranged to use an average amplitude determined based on the signals selected in the frequency domain as the amplitude of the received signal.

* * * * *